(12) United States Patent
Himberger et al.

(10) Patent No.: US 7,084,760 B2
(45) Date of Patent: Aug. 1, 2006

(54) SYSTEM, METHOD, AND PROGRAM PRODUCT FOR MANAGING AN INTRUSION DETECTION SYSTEM

(75) Inventors: Kevin D. Himberger, Raleigh, NC (US); Clark Debs Jeffries, Durham, NC (US); David M. McMillen, Tuxedo, NY (US); John Allan Ziraldo, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 210 days.

(21) Appl. No.: 10/838,711

(22) Filed: May 4, 2004

(65) Prior Publication Data

US 2005/0248457 A1 Nov. 10, 2005

(51) Int. Cl.
G08B 21/00 (2006.01)

(52) U.S. Cl. ............... 340/540; 340/541; 340/825.22; 340/539.19; 713/200; 713/201

(58) Field of Classification Search ............... 340/540, 340/541, 825.22, 539.13, 539.19, 5.1, 5.2, 340/5.22, 5.23; 713/200, 201; 709/223, 709/224; 705/1
See application file for complete search history.

(56) References Cited

U.S. PATENT DOCUMENTS

| | | | |
|---|---|---|---|
| 6,298,445 B1 | 10/2001 | Shostack et al. | 713/201 |
| 6,895,383 B1 * | 5/2005 | Heinrich | 705/7 |
| 2002/0059078 A1 | 5/2002 | Valdes et al. | 705/1 |
| 2002/0169982 A1 | 11/2002 | Brock et al. | 713/201 |
| 2003/0051026 A1 | 3/2003 | Carter et al. | 709/224 |
| 2003/0056116 A1 | 3/2003 | Bunker et al. | 713/201 |
| 2003/0084322 A1 | 5/2003 | Schertz et al. | 713/200 |
| 2003/0236990 A1 * | 12/2003 | Hrastar et al. | |

* cited by examiner

*Primary Examiner*—Hung Nguyen
(74) *Attorney, Agent, or Firm*—Richard M. Goldman (57) ABSTRACT

An intrusion event detection system, method, and program product with an enumeration of specific known benign intrusion events, and performing a vulnerability test on specific elements of the computer system for the particular known benign intrusion event. These vulnerability tests are performed at predetermined time intervals measured from a previous test or previous intrusion event of the known benign intrusion event. The predetermined time interval is increased based on various attributes, passage of time since the last intrusion event of either the specific known benign intrusion event or another known benign intrusion event, or even a an undetermined or harmful intrusion event, or the present detection of an intrusion even; or the vulnerability of a specific element in the computer system to a specific intrusion event.

14 Claims, 9 Drawing Sheets

SYSTEM, METHOD, AND PROGRAM PRODUCT FOR MANAGING AN INTRUSION DETECTION SYSTEM

FIELD OF THE INVENTION

The invention described herein relates to the protection of computer systems, including computer system hardware, software, and data from generally malicious intrusion, attack, destruction, unauthorized modification, and unauthorized disclosure. More particularly, the invention relates to recording intrusion attempts based upon harm to the system and immunity of the system to the particular attack.

BACKGROUND

Network attack traffic is a serious problem for all information technology users. The goals of network attack are many and varied, to crash a particular machine or particular server, to acquire network information, to misuse data, or to take control of a particular machine. One line of defense is the intrusion detection system.

Intrusion detection systems include host-based systems, network-based systems, and node-based systems. A host-based system generally monitors user activity on the system by examining alert messages, log files, etc., while a network-based system typically monitors all network activity and network traffic, and a node-based system typically monitors network activity to and from a specific computer system to detect attacks.

The term "intrusion detection" means identifying an attack event by matching the attack event to known patterns that are emblematic of malicious traffic, with human interaction frequently required. The term "intrusion protection" means studying the statistical behavior of traffic to deduce whether or not the traffic is malicious, and should be dropped or quarantined. In intrusion detection there may be either automatic reaction by the system or automatic suggestion of a reaction that a human operator can take. In this regard, intrusion detection systems typically create a log for human study.

Intrusion events include attacks by viruses and worms. A virus is software designed to induce a user to execute it, which causes the virus to replicate and distribute itself. Boot viruses attached to the boot sector of a hard disk drive are automatically executed upon booting. File viruses are attached to executable program files so as to execute when a user runs the infected program. As used herein, the term virus includes code that act like a virus, worm, or any variant thereof.

The problems with existing intrusion detection systems include false positives (identifying a benign program as a virus, worm, or other intrusion), false negatives (failing to identify a virus, worm, or other intrusion as an attack, and instead mis-identifying it as a benign program), and the overhead associated with intrusion detection monitoring. A further problem with present intrusion detection systems is that they generate so much data, that is, they capture so many events, that the captured data, that is, identified events, can not be readily interpreted and mapped to identified real intrusion attack risks.

There is a clear need to reduce the number of reported, recorded, and logged intrusion detection events in the Intrusion Detection System.

SUMMARY OF THE INVENTION

These problems are substantially reduced by the method, system, and program product described herein. The invention described herein is an enhanced intrusion event detection system on a computer system. The intrusion detection system described herein uses intelligent distillation of event sampling, and recording. This is based on an understanding that most intrusion events are extremely repetitive over a reasonable time span, for example, hour by hour, or day by day. With this assumption, after an initial detection of an attack type that is shown to be harmless, for example as a result of the current operating system, patches, service packs, and application software, the particular event need not be recorded at every occurrence.

In this context an attack event (intrusion) can usually be shown to be harmless based upon two factors:

1. Is either the operating system including its patches and service packs, or the application software running on the machine a possible target of this kind, type, or form of attack; or
2. Do the patches and service packs and upgrades provided to the operating system and applications running on this machine provide vulnerability to this kind of attack.

The above events are "impossible" events and are filtered. Intelligent filtration requires periodic retesting of machines for the presence of new patches, upgrades, service packs, and applications that do not share this immunity, and thereby render the machine susceptible to attack.

Within this context, the method, system, and program product of our invention provides periodic reality checks for new and altered machines that might constitute vulnerabilities.

The intrusion event detection system, method, and program product is specifically characterized by: an enumeration of specific known benign intrusion events, and performing a vulnerability test on specific elements of the computer system for the particular known benign intrusion event. These vulnerability tests are performed at predetermined time intervals measured from a previous test or previous intrusion event of the known benign intrusion event. The predetermined time interval is increased based on various attributes, such as the passage of time since the last intrusion event of either the specific known benign intrusion event or another known benign intrusion event, an undetermined or harmful intrusion event, the present detection of an intrusion even, or the vulnerability of a specific element in the computer system to a specific intrusion event.

The invention may be practiced within the context of an actual detection of an intrusion event, comparing the detected intrusion event to a list of known benign intrusion events, and either issuing an intrusion event notification if the detected intrusion event is not on the list of known benign intrusion events, or else making an entry on the list of known benign intrusion events if the intrusion event is on a list of known benign intrusion events.

THE FIGURES

Various aspects of our invention are illustrated in the FIGURES appended hereto.

DETAILED DESCRIPTION OF THE INVENTION

The method, system, and program product of our present invention illustrated in FIGS. 1 through 9. In the FIGURES like numerals are used for like and corresponding elements of the various FIGURES.

Figure 1:
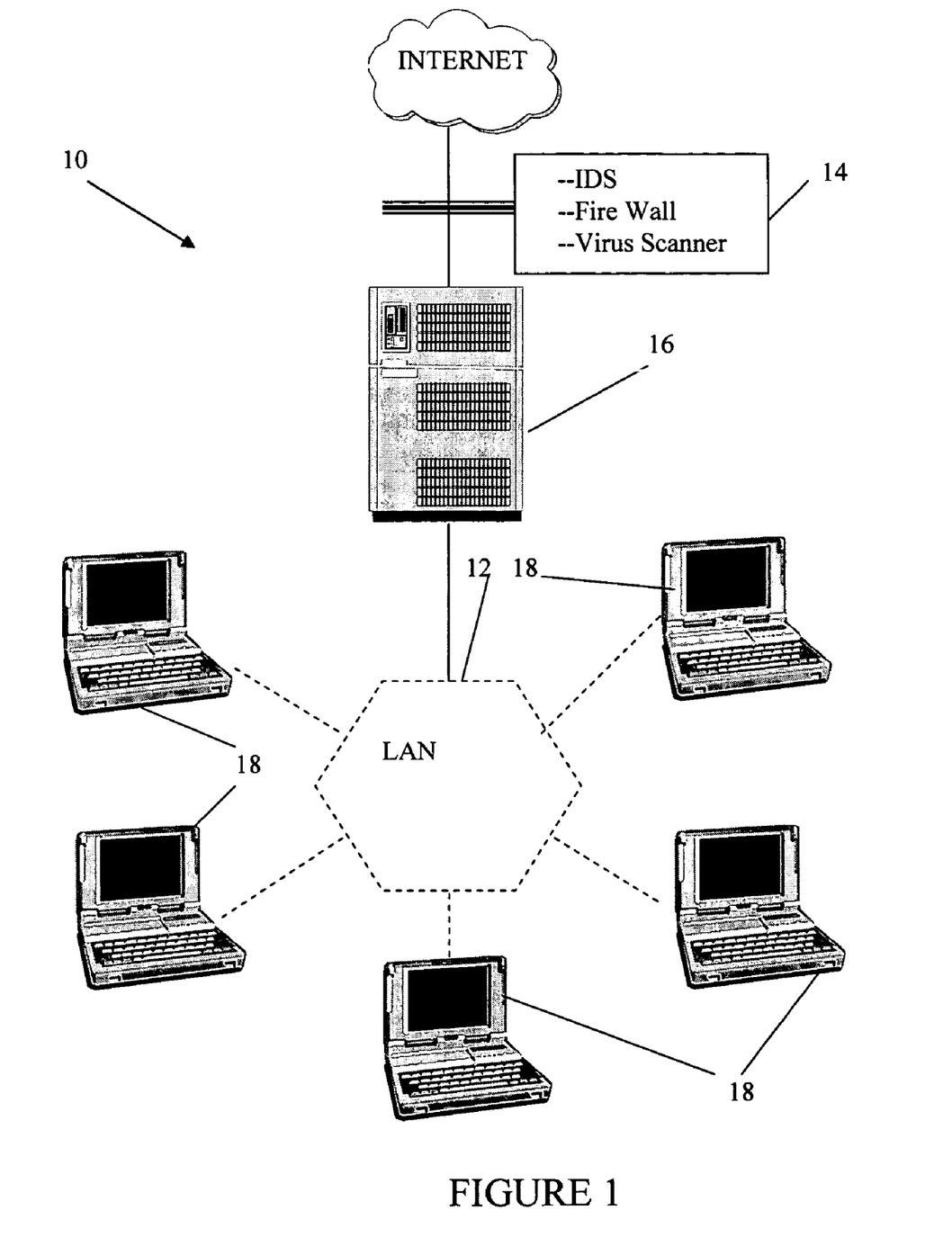
FIG. 1 illustrates a simplified block diagram of the present invention including an intrusion protection or detection system, firewall, and anti-virus system, protecting a LAN server, and individual terminals on the Local Area Network.

FIG. 1 is a simplified block diagram of the present invention 10, which includes an intrusion protection or detection system, firewall, and anti-virus system 14, protecting a LAN server, 16, and individual terminals, 18 on the Local Area Network, 12.

The method, system, and program product of our invention may be applied to network based, host based, or node based systems. Network-based intrusion protection systems are generally deployed at or near the entry point of a network, for example, the firewall and the virus scanner. Network-based intrusion detection systems analyze inbound data packets from the Internet and compare the packets against a database of various known attack signatures or bit patterns, and against a database of known benign signatures and bit patterns. When an alert is generated, indicating a possible malicious intrusion or attack, the alert is logged and may be transmitted to a management system. This management system, not shown, will typically perform a corrective action. This can include, by way of example and not limitation, enabling a filter rule in a firewall or router that drops traffic destined to a particular port number.

One advantage of network-based intrusion protection systems is that they generally provide real-time, or near real-time, detection of attacks, and are relatively easy to deploy.

Alternative classes of intrusion detection systems include host-based intrusion protection systems, also referred to as "log watchers." Host based intrusion protection systems typically detect intrusions by monitoring system logs. Typically, host-based intrusion systems reside on the system to be protected. One advantage of host-based intrusion protection systems is that they generally generate fewer "false-positives," that is, incorrect diagnosis of attacks, than do network-based intrusion protection systems. A further advantage of host based intrusion detection systems is that they are particularly effective at detecting intrusions at the application level. This includes analysis of database engine access attempts and changes to system configurations. One shortcoming of host based log-watching systems is that they generally cannot detect intrusions before the intrusion has taken place and they have heretofore provided little assistance in preventing future attacks.

At a further step down in level and a concomitant increase in granularity, Inline intrusion protection systems actually include embedded intrusion protection capabilities in the protocol stack of the system being protected. By this expedient, all traffic received by and originating from the system can be monitored by the inline intrusion protection system. Inline intrusion protection systems are effective for monitoring traffic on high-speed networks.

Referring more specifically to FIG. 1, one or more networks may interface with the Internet. A LAN, 12, of interest is connected to the Internet via a router (not shown). The LAN, 12, includes an intrusion protection or detection system, firewall, and anti-virus system 16, protecting the LAN server, 14, and the individual terminals, 18 on the Local Area Network, 12.

Figure 2:
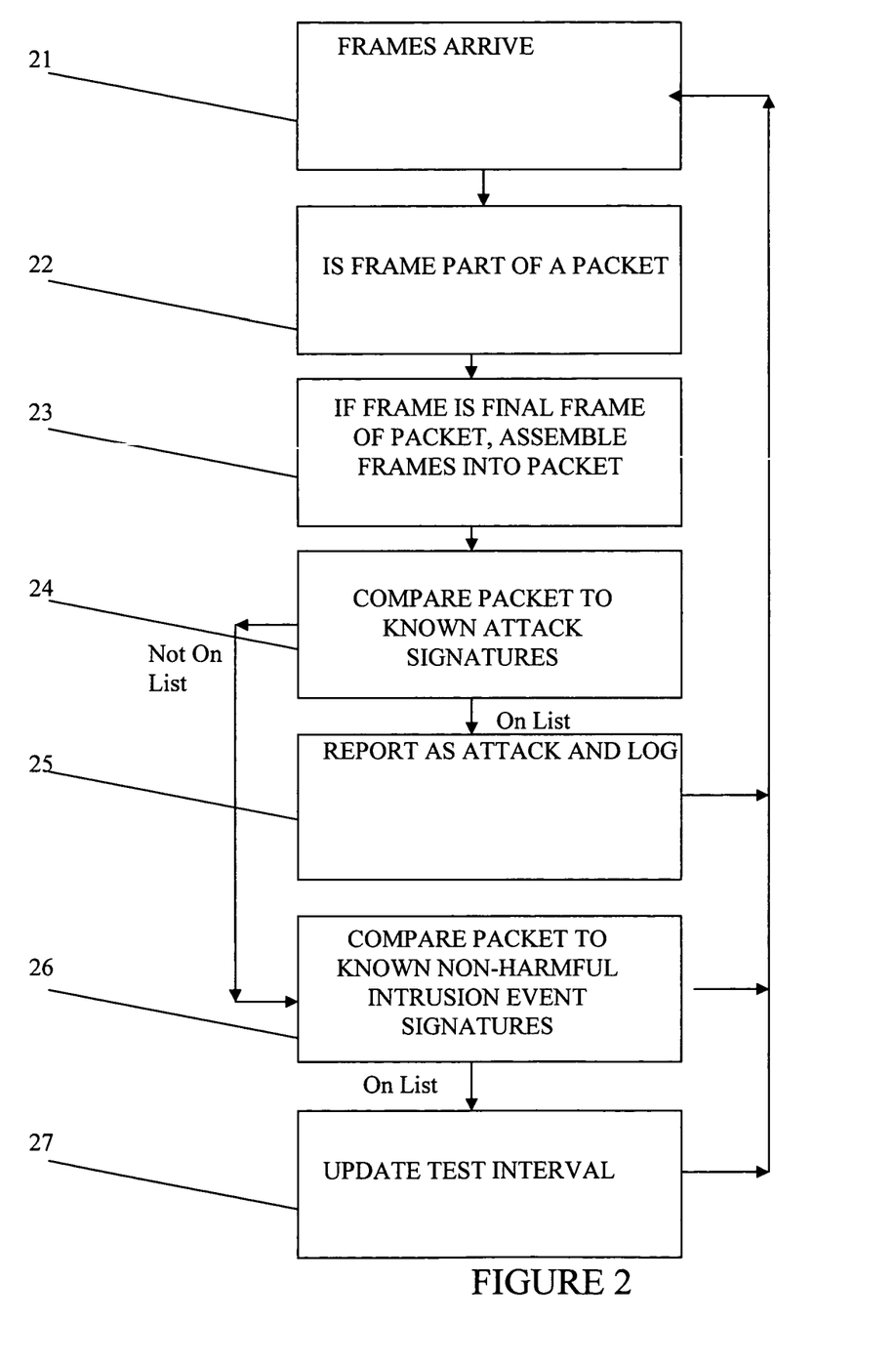
FIG. 2 illustrates a high-level flow chart of the operation of an incident detection system according to the method, system, and program product of our invention.

FIG. 2 illustrates a high-level flow chart of the operation of an incident detection system according to the method, system, and program product of our invention. As illustrated in FIG. 2, the frames arrive, 21, and a determination is made as to whether or not the frames are part of a packet, 22. If the frame is a final frame of a packet, 23, the packet is compared to known attack signatures, 24. If the packet is not on the list or enumeration of known attack signatures, the packet is compared to known benign or non-harmful intrusion event signatures, 26, and if the packet is on the list or enumeration, the test interval is updated, 27, and the next frame analyzed, 21. If, however, comparison of the packet to known attack signatures shows that the packet has a known attack signature, 24, the intrusion event is reported as an attack and appropriate action taken, as logging, 25, and blocking.

Figure 3:
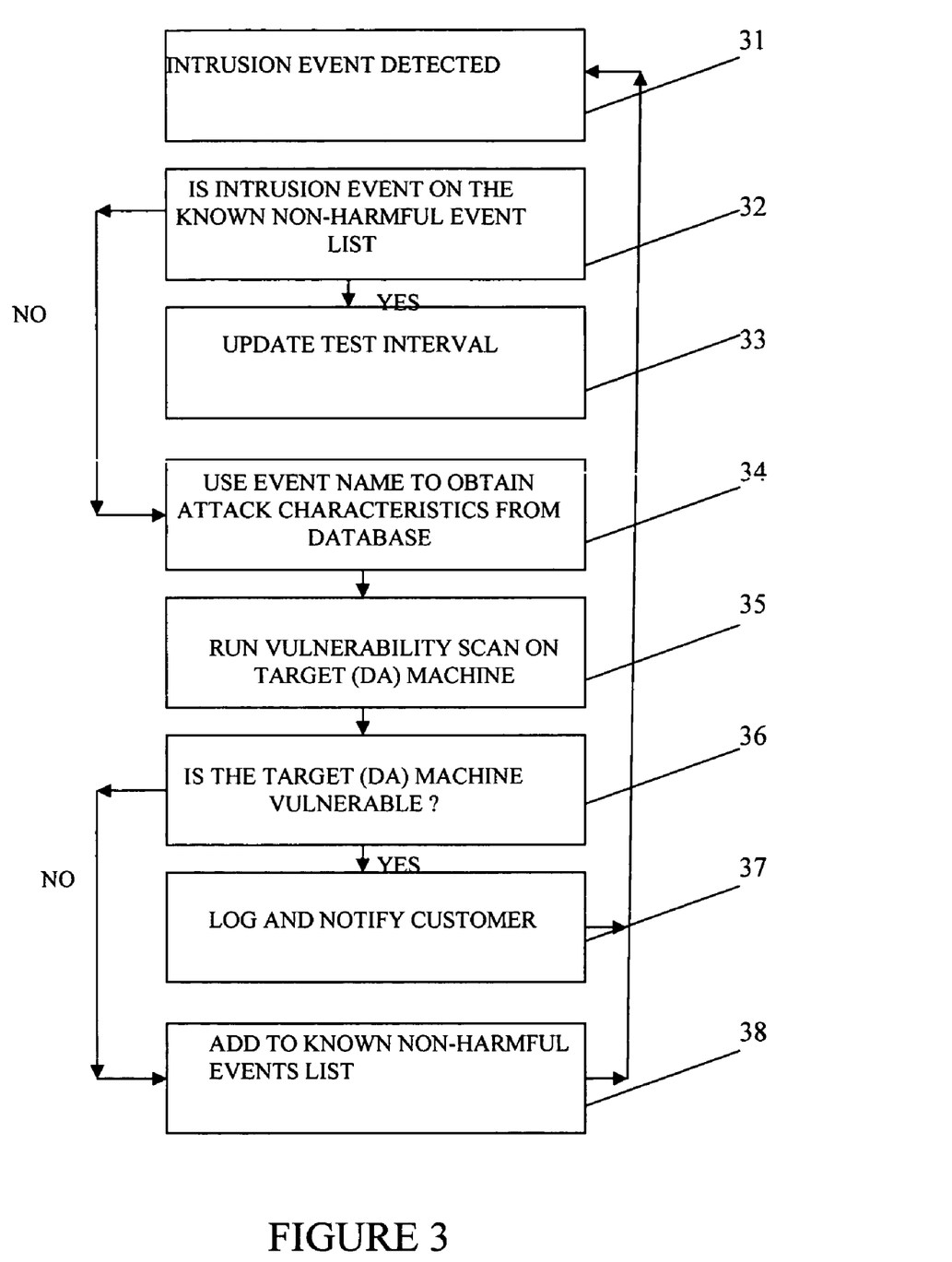
FIG. 3 illustrates a high-level flow chart of the invention for the periodic testing algorithm of the invention. The algorithm determines the type of intrusion event, updates the test interval, runs a vulnerability scan, and augments the associated databases of the intrusion detection system.

FIG. 3 illustrates a high-level flow chart of the invention for the periodic testing algorithm of the invention. The algorithm detects an intrusion event, 31, determines the type of intrusion event, 32, and updates the test interval if the intrusion event is a known benign or impossible intrusion event, 33. If the intrusion event is not a known benign or impossible intrusion event, the attack characteristics of the attack are obtained from a database, 34, vulnerability scan run on the target machine or destination address (DA), 35. If the vulnerability scan, 36, determines vulnerability, the event is logged and appropriate databases augmented, and the appropriate action taken, 37. If the machine is not vulnerable, the attack type and its characteristics are entered in the appropriate databases, 38. Control is returned to await the next intrusion event.

Figure 4:
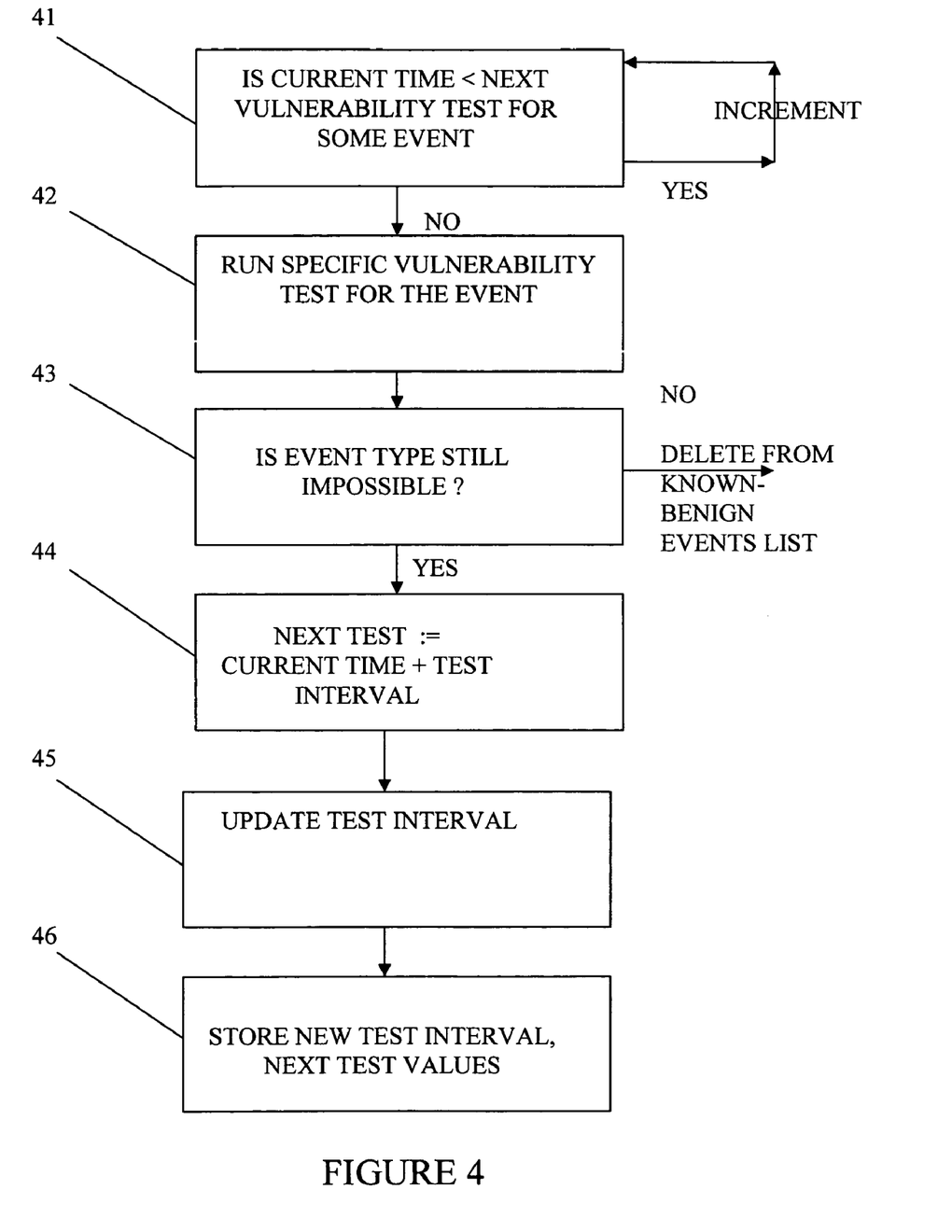
FIG. 4 illustrates a high-level flow chart of the invention for the periodic specific vulnerability based purging of the "impossible" and "known benign" event list.

FIG. 4 illustrates a high level flow chart of the invention for the periodic specific vulnerability based purging of "impossible" and "known benign" event list. The system first tests to determine if the current time is less then the next vulnerability test for an event, generally, 41. If so, the clock or counter is incremented for the next test. If, however, the current time is equal to or greater then the time for a vulnerability test for some event, 41, the test, for example, a specific test for a specific vulnerability to a specific attack type, is run, 42. If the event type is possible, and a vulnerability is detected, the event the is deleted from the enumeration of known benign or impossible events, 43. Otherwise, the time for the next vulnerability test or scan is incremented from the current time to the current time plus a test interval, 44, and the test interval updated, 45. The new test interval is stored, 46.

Figure 5:
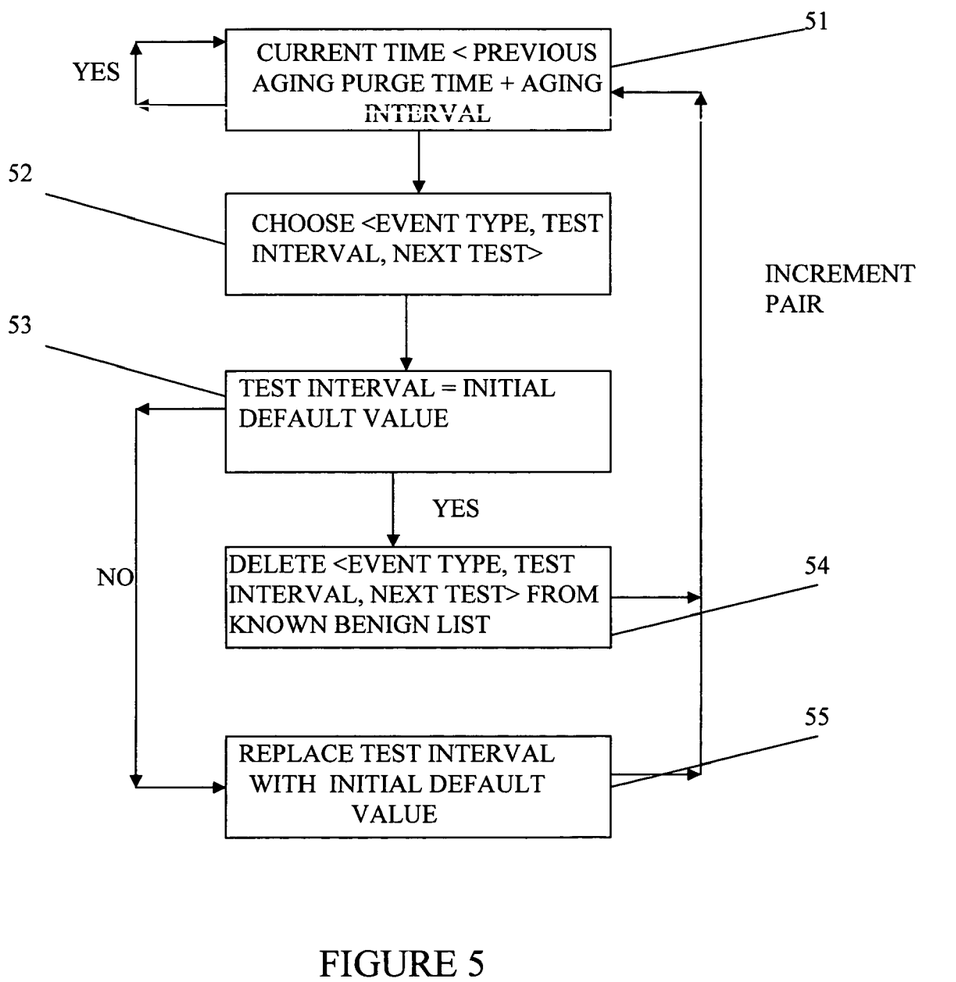
FIG. 5 illustrates a high-level flow chart of the invention for the periodic age based purging of the "impossible" and "known benign" event list.

FIG. 5 illustrates a high-level flow chart of the invention for the periodic age based purging of the "impossible" and "known benign" event list. As shown in the FIG., if the current time is less then the previous aging purge time plus an aging interval, the system waits for the next time increment, 51. If, however, if the current time is greater then or equal to the previous aging purge time plus the aging interval, an event is selected based on event type, test interval, and time for the next test. The test interval is compared to an initial default value, 53. If the test condition is met, the event is deleted by the age based purge, 54, and the test interval is replaced with a new initial default value, 55.

The method, system, and program product of our invention uses aging to increment test intervals of the "known benign" or "impossible" enumeration. This facilitates an effective response by statistical and/or behavioral recognition of an attack on the target system. The system, method, and program product learns from detection experiences and estimates or guesses how long a sequence of attacks will persist.

This is accomplished by progressive responses to malicious traffic. In the system that is the subject matter herein, the response is recording (logging) an occurrence of an attack. Broadcast of this entry enables a companion system to discard packets having header values as defined by blocking rules.

To illustrate the method, system, and program product of our invention, time is measured in time step increments, $\Delta t$. In this context, the initial reporting and logging of an attack or the initial enforcement of a blocking measure can be compute intensive, and therefore it is desirable not to change the decision to log and/or enforce a blocking measure or not to log and/or enforce a blocking measure at every interval, $\Delta t$.

With respect to $\Delta t$, generally $\Delta t$ starts at a low level (on the order of seconds, such as 128 seconds) and increases, for example linearly or exponentially (such as doubling) to a $\Delta t$ on the order of days, for example $2^{20}$ seconds (about 10 days). The initial value of $\Delta t$, the rate of increase of $\Delta t$, the size of the increments to $\Delta t$, and the upper limit of $\Delta t$ can all be adjusted based upon user experience.

Upon the first detection of a particular attack or intrusion event or other suspicious activity, the method, system, and program product described herein reacts in the next time interval, $\Delta t$, by recording the event and broadcasting the occurrence of the event.

After a finite time period, generally at least about $\Delta t$, and generally an increasing multiple of $\Delta t$, the recording and logging response is temporarily suspended. The system described herein listens for traffic, that is, the system retests for the persistence of the malicious traffic. If the retests over the time interval, that is, the time interval, $\Delta t$, reveal that the suspicious behavior is absent, then the initial value of the interval is fetched, and the response is set to an initial state. If, however, malicious traffic is detected, then the recording and blocking measures are reinforced and held for a new period of time that is at least as long as the previous period of recording and enforcement, and the incremented time value stored.

While the interval has been described as a time interval, $\Delta t$, it is, of course, to be understood that the interval may be measured in terms of packets, n, or even frames, m. In this case, initially m or n could be a small number of frames or packets, increasing up to $2^{10}$ or $2^{20}$ frames or packets. And, while the increasing interval has been described in terms of a multiple of $\Delta t$, it is to be understood that the multiple need not be, and frequently will not be, a whole number multiple of $\Delta t$ or n, but may be some fractional multiple greater then 1.0. Time (or number of packets) is partitioned into intervals of, e.g., constant time or constant numbers of packets. At every passage of $\Delta t$, the system is updated.

Figure 6:
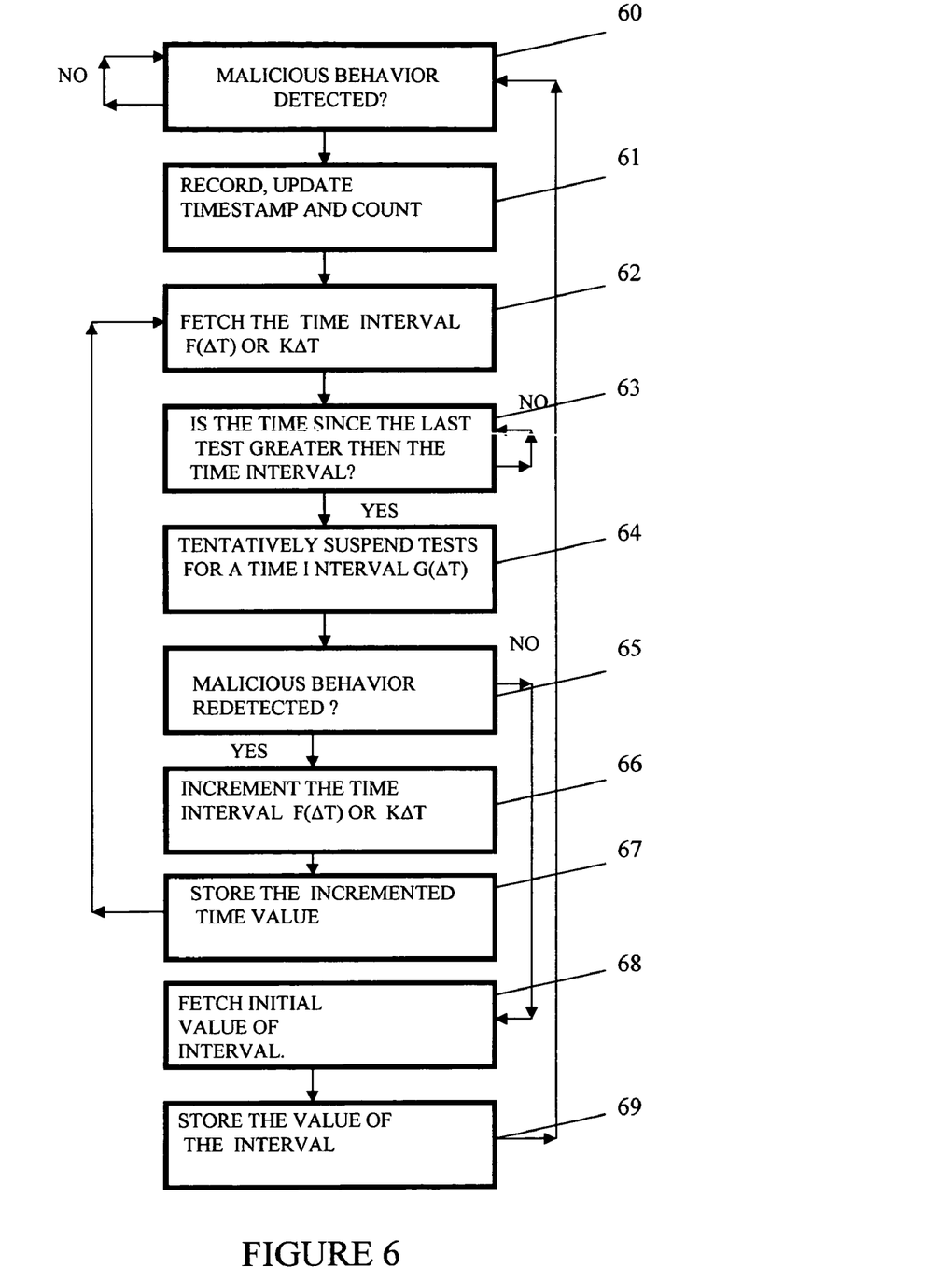
FIG. 6 illustrates a high-level flow chart of the invention for incrementing the test interval for verifying entries on the "impossible" or "known benign" enumeration.

The flowchart of FIG. 6 illustrates one embodiment of how the time interval for a next vulnerability test or for purging an intrusion event from the list of known benign intrusion events is carried out. Block 60 is a test to determine if an intrusion event has been detected. If no event is detected, monitoring continues, but if an event is detected, a time stamp and count are updated as shown in block 61. Next the value of the time interval since the later of the last attack or the last vulnerability test to the next vulnerability test, shown as a function of $\Delta t$, $f(\Delta t)$, in block 62 is fetched, and compared to the actual time interval since the later of the last attack or the last vulnerability test to present time, block 63. To be noted is that incrementation by a function, as $\Delta t$, typically continues up to some preset value, e.g., set by the administrator or by default. While illustrated with respect to a function of $\Delta t$, $f(\Delta t)$, it is to be understood that the increment can be a function of the number of frames or packets, m or n, $g(n)$.

If the proper interval has passed, the rule for logging is suspended, block 64, and a vulnerability test conducted, block 65. If vulnerability is detected the time to the next vulnerability test, $f(\Delta t)$, is incremented, Block 66 and stored, block 67. If however, no malicious behavior is detected, block 65, the initial value of the time interval to the next vulnerability test is fetched, block 67, and stored, block 68.

Figure 7:
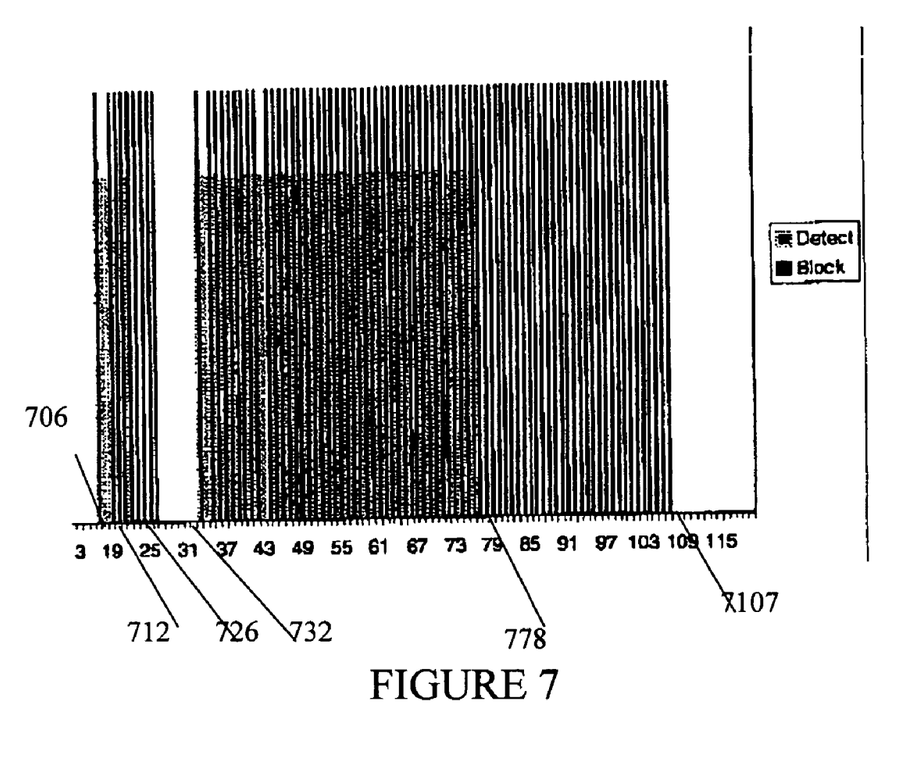
FIG. 7 illustrates the performance of the test interval incrementing method illustrated in FIG. 6 in identifying intrusion events.

FIG. 7 shows the output of the above process. As shown in FIG. 7, if there is a single false positive, the reaction is blocking for one time step only, 706. This is the first short-grey, long-black line pair. Then there are no more false positives. The illustrated timestep is a series of positive indications. The reaction is one timestep of blocking, then a retest. Since the anomaly continues, the block is applied for a longer time period. Then the anomaly stops about timestep 710. The block retests at timestep 726 and finds no persistent anomaly, so the block is withdrawn. The system goes back to the ready state.

Then a long anomaly starts about timestep 732 and lasts to about timestep 778. The blocking measure comes on and then off, retests, and finally is applied for a relatively long time (64 consecutive timesteps). Finally at timestep 71107 there is a retest, the system discovers the anomaly is gone, and the blocking measure is withdrawn. The system returns to the ready state.

As seen in FIG. 7, if there are several tests that reveal all is well, then the spacing between tests is rapidly (such as linearly or exponentially) increased, up to a limit.

Figure 8:
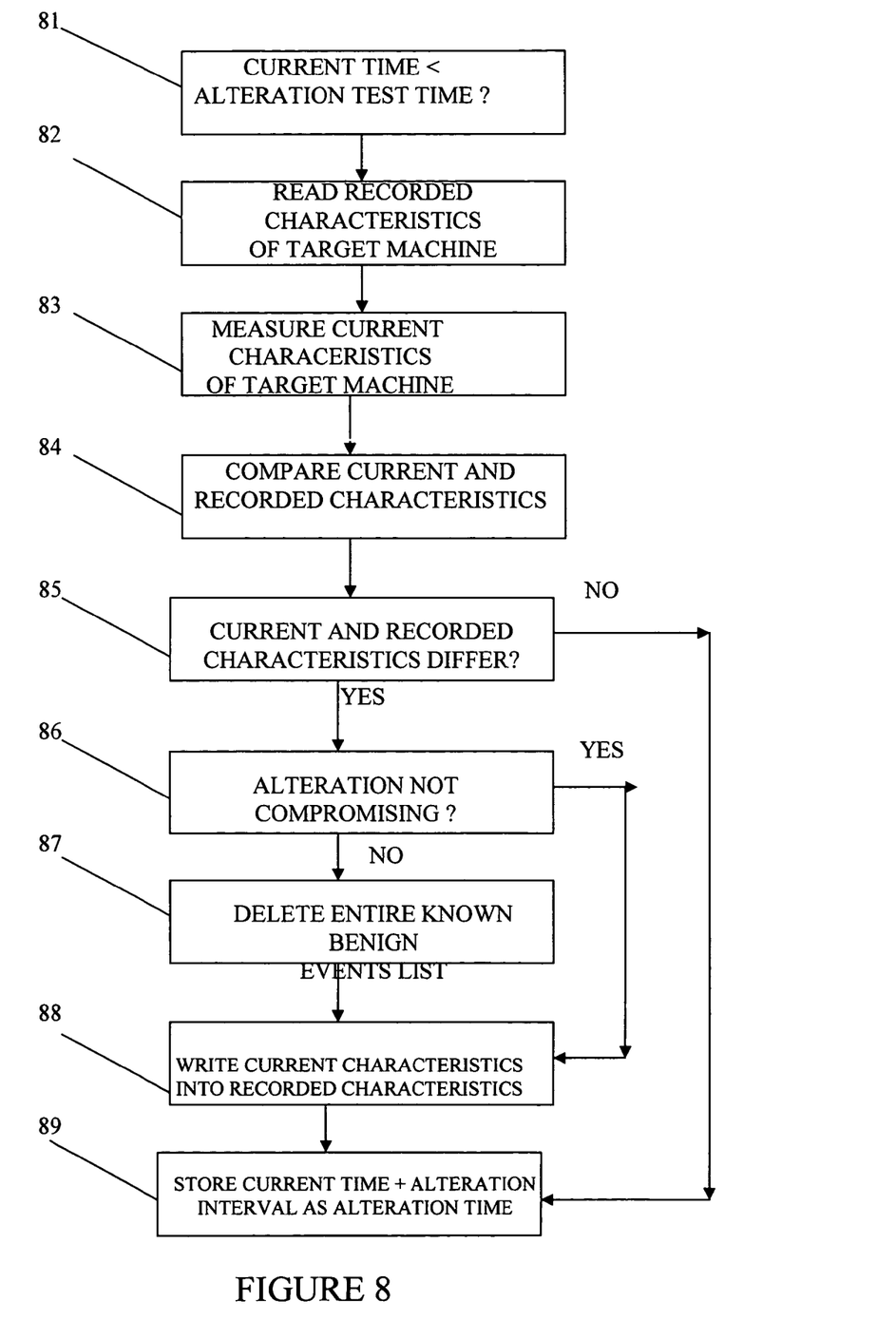
FIG. 8 illustrates a high-level flow chart of the invention purging of the "impossible" or "known benign" enumeration based upon machine alterations.

FIG. 8 illustrates an impossible or known benign event alteration purge. This is a purge from the impossible or known benign event enumeration necessitated by the alteration of the target machine. The alteration can be a new application, operating system, upgrade, patch, or service pack. A test is run to determine if the time interval has passed to conduct an alteration purge, 81. Once this test has been met, the recorded characteristics of the target machine are read, 82, and current characteristics of the machine measured, 83, and a comparison run of the current characteristics and recorded characteristics of the target machine, 84. If the recorded characteristics do not differ from the current characteristics, 85, the time for the next test is calculated and recorded, 89, and the routine exited. If, however, the current and recorded characteristics differ, 85, a test is run to see if the alteration is compromising, 86. If the results are not comprising, 86, the current characteristics are written into the recorded characteristics, 88, and the current time 86, then the entire known benign events list is deleted, 87, the current characteristics are written into the recorded characteristics, and the time incremented by the alteration interval to the time of the next test, 88.

Figure 9:
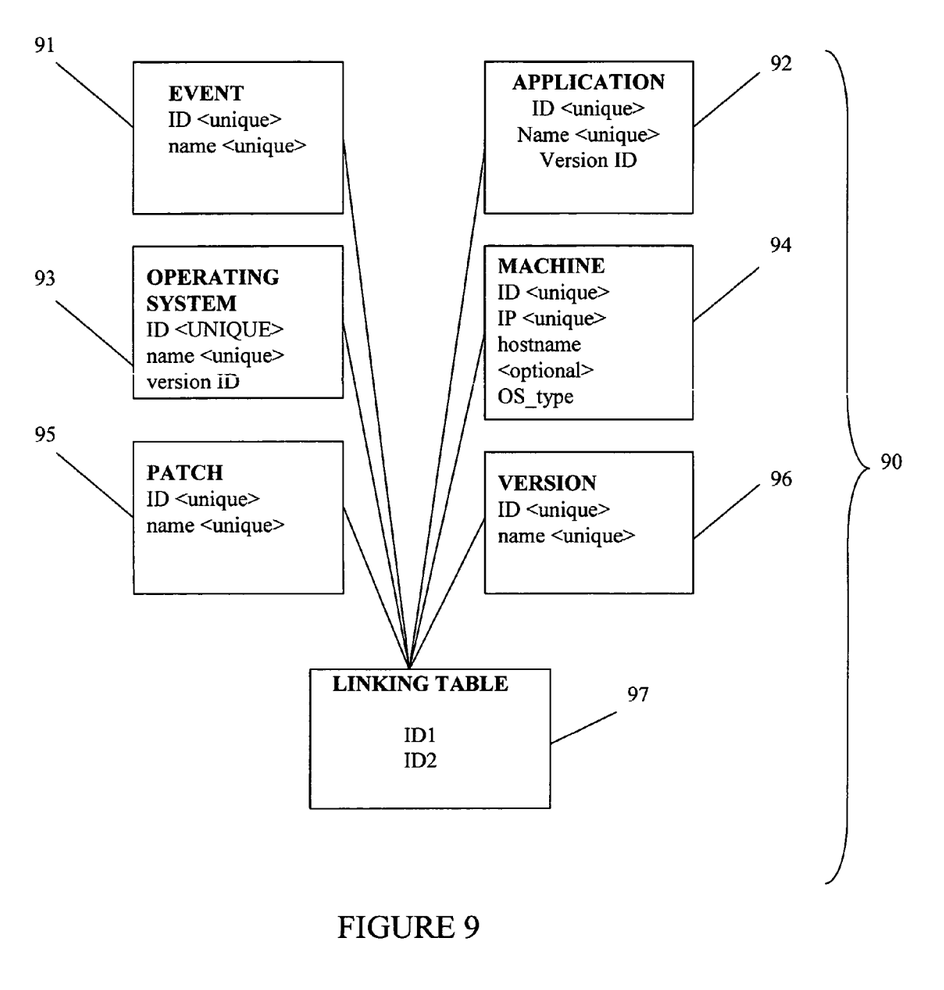
FIG. 9 illustrates a high level representation of one relational database structure or schema that could be used in the practice of the invention.

FIG. 9 is a high level schematic view of a possible database, that is, of a database schema, to implement the method, system, and program product of our invention. The database, 90, includes an Event table, 91, with a unique event ID and a unique event name, an application table, 92, with a unique application ID, a unique application name, and a version ID, and operating system table, 93, with a unique operating system ID, a unique operating system name, and a unique operating system version ID. The database also includes a machine table, 94, with a unique machine ID, a unique machine IP address, an optional host name, and the machine's operating system type. A further table is the patch and service pack table, 95, with a unique ID and unique name. Also included is a version table, 96, with a unique version ID and a unique version name. The tables are joined through a linking table, 97.

While the database is referred to as a single database, with multiple tables, it is to be understood that various database schema are included, including linking multiple databases, or a single database with specific entries having predefined characteristics, attributes, and metadata, as data items (events, operating systems, patches and service packs, applications, machines, versions, and upgrades, as well as master keys). Moreover, each of the types of data items will contain one or more of a unique ID, a unique name, a version ID, a host name, and an operating system type.

The method, system, and program product of our invention may be used with both intrusion detection systems and intrusion prevention systems, where, as used herein an "intrusion detection" system is a system that identifies an attack event by matching the attack event to known patterns that are emblematic of malicious traffic, with human interaction frequently required. As used herein, an "intrusion protection" system is a system that studies statistical behavior of traffic to deduce whether or not the traffic is malicious, and should be dropped or quarantined. In intrusion detection systems the response may be either an automatic reaction by the system or an automatic suggestion of a reaction that a human operator can take. In this regard, intrusion detection systems typically create a log for human study.

The invention may be implemented, for example, by having the intrusion detection system, the database system and management system for the intrusion detection system, the anti-virus system, and the firewall system all execute sequences of machine-readable instructions, which are also referred to as code. These instructions may reside in various types of signal-bearing media. In this respect, one aspect of the present invention concerns a program product, comprising a signal-bearing medium or signal-bearing media tangibly embodying a program of machine-readable instructions executable by a computer system to perform a method for managing an intrusion detection system.

This signal-bearing medium may comprise, for example, memory in a server. The memory in the server may be non-volatile storage, a data disc, or even memory on a vendor server for downloading to a server for installation.

Alternatively, the instructions may be embodied in a signal-bearing medium such as the optical data storage disc. The optical disc can be any type of signal bearing disc or disk, for example, a CD-ROM, CD-R, CD-RW, WORM, DVD-R, DVD+R, DVD-RW, or DVD+RW. Additionally, whether contained in a cluster with the server or elsewhere, the instructions may be stored on any of a variety of machine-readable data storage mediums or media, which may include, for example, a "hard drive", a RAID array, a RAMAC, a magnetic data storage diskette (such as a floppy disk), magnetic tape, digital optical tape, RAM, ROM, EPROM, EEPROM, flash memory, magneto-optical storage, paper punch cards, or any other suitable signal-bearing media including transmission media such as digital and/or analog communications links, which may be electrical, optical, and/or wireless. As an example, the machine-readable instructions may comprise software object code such as binary code, assembler code, or code compiled from a language such as "C++".

Additionally, the program code may, for example, be compressed, encrypted, or both, and may include executable files, script files and wizards for installation, as in Zip files, cab files, and the like. As used herein the term machine-readable instructions or code residing in or on signal-bearing media include all of the above means of delivery.

While our invention has been described with respect to certain preferred embodiments and exemplifications, it is not intended to limit the scope of our invention thereby, but solely by the claims appended hereto.

We claim:

1. A method of managing an intrusion event log on an intrusion event detection system of a computer system comprising:
   a. providing a list of known benign intrusion events by:
   b. performing a vulnerability test on an element of said computer system for said known benign intrusion event at a predetermined time interval from a previous test or previous intrusion event of said known benign intrusion event; and
   c. increasing the predetermined time interval to said next text.

2. The method of claim 1 comprising managing the list of known benign intrusion events by performing a vulnerability test on an element of said computer system for said known benign intrusion event at a predetermined time interval from a previous test or previous intrusion event of said known benign intrusion event; and increasing the predetermined time interval to said next event up to a preset limit.

3. The method of claim 1 comprising increasing the predetermined time interval from a previous test or intrusion event until a next scheduled vulnerability test based upon at least one of:
   a. passage of time since the last intrusion event;
   b. detection of an intrusion even;
   c. the vulnerability of a specific element in the computer system to a specific intrusion event; and
   d. a preset limit.

4. The method of claim 1 comprising periodically purging the known benign event list.

5. The method of claim 1 comprising periodic age based purging of the known benign event list.

6. The method of claim 1 comprising alteration based purging of the known benign event list.

7. The method of claim 1 comprising testing the computer system for vulnerability to an intrusion event, including the steps of:

a. if vulnerability is detected, incrementing the time to the next vulnerability test;
b. else, storing the present value of the time interval to the next vulnerability test.

8. A program product to control a computer to:
a. detect an intrusion event;
b. compare the detected intrusion event to a list of known benign intrusion events;
c. issue an intrusion event notification if the detected intrusion event is not on the list of known benign intrusion events;
d. else make an entry on the list of known benign intrusion events if
the intrusion event is on said list of known benign intrusion events; and further adapted to manage the list of known benign intrusion events by:
a. performing a vulnerability test on an element of said computer system for said known benign intrusion event at a predetermined time interval from a previous test or previous intrusion event of said known benign intrusion event; and
b. increasing the predetermined time interval to said next event.

9. The program product of claim 8 wherein the program product manages the list of known benign intrusion events by performing a vulnerability test on an element of said computer system for said known benign intrusion event at a predetermined time interval from a previous test or previous intrusion event of said known benign intrusion event; and increasing the predetermined time interval to said next event to a preset limit.

10. The program product of claim 8 further adapted to increase the predetermined time interval from a previous test or intrusion event until a next scheduled vulnerability test based upon at least one of:
a. passage of time since the last intrusion event;
b. detection of an intrusion even;
c. the vulnerability of a specific element in the computer system to a specific intrusion event; and
d. a preset limit.

11. The program product of claim 8 further adapted to periodically purge the known benign event list.

12. The program product of claim 8 adapted to conduct periodic age based purging of the known benign event list.

13. The program product of claim 8 adapted to conduct computer system alteration based purging of the known benign event list.

14. The program product of claim 8 adapted to test the computer system for vulnerability to an intrusion event, including the steps of:
a. if vulnerability is detected, incrementing the time to the next vulnerability test;
b. else, storing the present value of the time interval to the next vulnerability test.

* * * * *